J. O. YARDLEY.
NON-GLARE LENS FOR HEADLIGHTS.
APPLICATION FILED AUG. 5, 1919.

1,352,236.

Patented Sept. 7, 1920.

INVENTOR.
John O. Yardley
BY
ATTORNEY

UNITED STATES PATENT OFFICE.

JOHN O. YARDLEY, OF STOCKTON, CALIFORNIA.

NON-GLARE LENS FOR HEADLIGHTS.

1,352,236.     Specification of Letters Patent.     Patented Sept. 7, 1920.

Application filed August 5, 1919. Serial No. 315,467.

*To all whom it may concern:*

Be it known that I, JOHN O. YARDLEY, a citizen of the United States, residing at Stockton, in the county of San Joaquin, State of California, have invented certain new and useful Improvements in Non-Glare Lenses for Headlights; and I do declare the following to be a full, clear, and exact description of the same, reference being had to the accompanying drawings, and to the characters of reference marked thereon, which form a part of this specification.

This invention relates to improvements in lenses for headlights, and particularly those on automobiles.

The principal object of the invention is to provide a device adapted to be held in the lens-rim of a headlight in place of the usual lens, by means of which the full brilliance of the lamp will be thrown onto the ground a suitable distance ahead of the car, so that the driver may readily see the road ahead, while at the same time the light in the lamps themselves will be almost wholly invisible to a person to whom the car is approaching, or will be seen only as a soft green or other colored glow.

With the use of my lens, therefore, all danger of accidents such as occur at the present time, owing to the temporary blinding of one or the other of the parties involved caused by the glare of the headlights, will be entirely eliminated, while at the same time enough light at the actual location of the lamps will be visible to enable anybody to easily stop or steer his car to one side of an approaching vehicle.

Another object of the invention is to produce a simple and inexpensive lens, and yet one which will be very effective for the purpose for which it is intended.

These objects I accomplish by means of such structure and relative arrangement of the parts as will fully appear by a perusal of the following specification and claims.

On the drawings, similar characters of reference indicate corresponding parts in both views.

Figure 1:
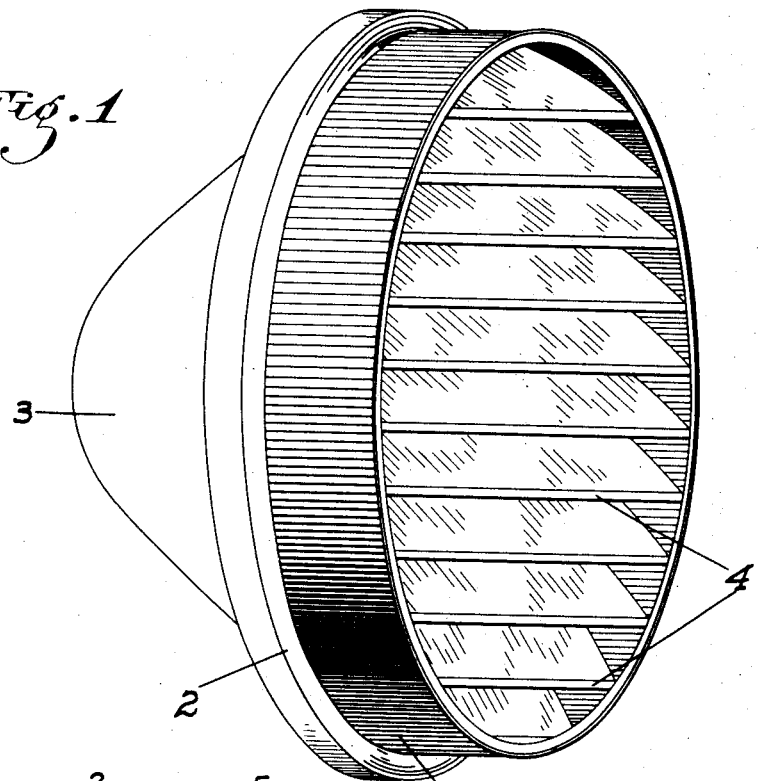
Figure 1 is a perspective outline of a standard form of automobile headlight, showing my improved lens therein.
Figure 2:
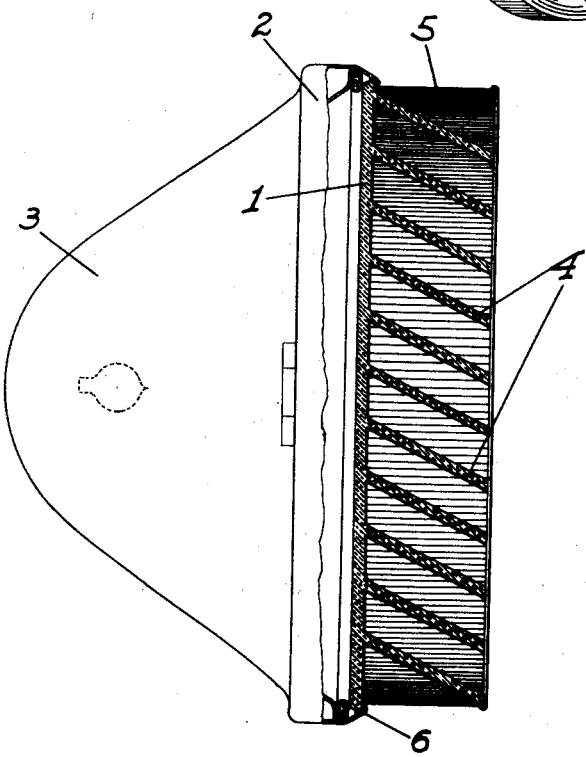
Fig. 2 is a cross section through the lens.

Referring now more particularly to the numerals of reference on the drawings, the numeral 1 designates a circular clear glass disk or lens, of the same size as the present lenses, and adapted to be held in the rim 2 of the headlight 3 in the usual manner.

Integral with the lens 1 in transverse and parallel alinement thereon are a plurality of deflecting plates or slats 4. These plates extend outwardly a certain distance and across the lens from side to side, terminating short of the periphery of the lens a distance sufficient to enable the rim 2 to grip the lens and hold it in place.

A sheet metal ring 5 is mounted around the plates to protect the same, being beaded around the periphery of the lens 1 as at 6, and held in place with the lens by the rim 2.

The plates 4 are angled horizontally to throw the rays of light a suitable distance ahead of the lamp, the rear edge of each one being on a higher plane than the upper edge of the plate adjacent thereto, so that when looking directly into the lens, no direct and bright light will strike the eye.

The deflector plates are preferably colored green on both sides, by the "flashing" process, or they may be a solid green, the method used being which ever one is found most practicable in the glass working art.

From the foregoing description, it will be readily seen that I have produced such a device as substantially fulfils the objects of the invention as set forth herein. While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:—

1. In combination with a lens for headlights which comprises a clear glass disk and transverse and parallel plates formed therewith and projecting outwardly therefrom at a downward slant, an endless sheet metal ring positioned about the plates to shield the same, the ring being removably beaded onto the periphery of the disk, the rim of the headlight engaging the beaded portion of the ring to hold the same and the disk in place.

2. A lens for headlights comprising a glass disk adapted to be held by the rims of the headlight in place of the usual lens, transverse plates projecting outwardly from the disk, a guard ring surrounding the plates, and means whereby the ring will be held in place by the disk and rim.

In testimony whereof I affix my signature in presence of a witness.

JOHN O. YARDLEY.

Witness:
FRANK H. CARTER.